(12) United States Patent
Winkel et al.

(10) Patent No.: US 7,169,081 B2
(45) Date of Patent: Jan. 30, 2007

(54) METHOD FOR ACTUATING A CLUTCH AT LOW TEMPERATURES

(75) Inventors: Matthias Winkel, Weingarten (DE); Otto Ebner, Friedrichshafen (DE); Klaus Schweiger, Friedrichshafen (DE); Christoph Rüchardt, Bodolz (DE); Andreas Schwenger, Reislingen (DE); Marcus Gansohr, Salem (DE); Thomas Knoblauch, Saarbrücken (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 122 days.

(21) Appl. No.: 10/489,928

(22) PCT Filed: Aug. 30, 2002

(86) PCT No.: PCT/EP02/09712

§ 371 (c)(1),
(2), (4) Date: Mar. 16, 2004

(87) PCT Pub. No.: WO03/029681

PCT Pub. Date: Apr. 10, 2003

(65) Prior Publication Data

US 2004/0235618 A1   Nov. 25, 2004

(30) Foreign Application Priority Data

Sep. 28, 2001   (DE) ................ 101 48 203

(51) Int. Cl.
- *B60K 26/00* (2006.01)
- *B60K 26/02* (2006.01)
- *B60W 10/02* (2006.01)
- *B60W 10/04* (2006.01)

(52) U.S. Cl. .............. 477/173; 477/180; 477/181; 701/67

(58) Field of Classification Search ............... 477/173, 477/180, 181, 174; 701/67, 68; 192/82 T
See application file for complete search history.

(56) References Cited

U.S. PATENT DOCUMENTS

| | | | | |
|---|---|---|---|---|
| 4,366,890 A | * | 1/1983 | Suckow | 477/167 |
| 4,768,635 A | * | 9/1988 | Sakurai et al. | 477/169 |
| 5,050,451 A | | 9/1991 | Hussain | 74/844 |
| 5,190,130 A | * | 3/1993 | Thomas et al. | 477/176 |
| 5,601,172 A | * | 2/1997 | Kale et al. | 192/85 R |
| 6,024,673 A | | 2/2000 | Hayashi et al. | 477/171 |
| 6,045,484 A | | 4/2000 | Kosik et al. | 477/174 |
| 6,086,508 A | | 7/2000 | Kosik et al. | 477/74 |
| 6,139,467 A | | 10/2000 | Kosik et al. | 477/76 |
| 6,432,019 B1 | | 8/2002 | Yoshida | 475/216 |
| 6,440,039 B1 | | 8/2002 | Warren | 477/86 |

FOREIGN PATENT DOCUMENTS

| | | |
|---|---|---|
| DE | 691 23 920 T2 | 6/1997 |
| DE | 196 03 239 A1 | 7/1997 |
| DE | 196 17 446 A1 | 11/1997 |
| DE | 196 39 376 C1 | 3/1998 |
| DE | 196 39 377 C1 | 4/1998 |
| DE | 196 39 322 A1 | 5/1998 |
| DE | 198 23 772 A1 | 12/1998 |
| DE | 199 26 697 A1 | 12/2000 |
| DE | 100 36 251 A1 | 4/2001 |
| DE | 100 47 855 A1 | 5/2001 |
| EP | 0 239 416 A2 | 9/1987 |
| GB | 2 329 227 A | 3/1999 |

* cited by examiner

*Primary Examiner*—Tisha Lewis
(74) *Attorney, Agent, or Firm*—Davis & Bujold, P.L.L.C.

(57) ABSTRACT

A method for clutch actuation at low temperatures for a motor vehicle having a hydraulically actuatable clutch, below a predetermined temperature a situation-dependent pre-opening of the clutch is executed when a braking is probable.

7 Claims, No Drawings

METHOD FOR ACTUATING A CLUTCH AT LOW TEMPERATURES

This application is a national stage completion of PCT/EP02/09712 filed Aug. 30, 2002 which claims priority from German Application Serial No. 101 48 203.5 filed Sep. 28, 2001.

FIELD OF THE INVENTION

The instant invention relates to a method for actuating a clutch for a hydraulically actuatable clutch at low temperatures.

BACKGROUND OF THE INVENTION

In a hydraulically actuated clutch system such as often used in motor vehicles, there exists the problem that the clutch cannot be opened quickly enough especially at very low temperatures. It thus can happen that in a full brake application the engine becomes stalled. The reason for this is the high viscosity of the oil at low temperatures.

DE 196 39 377 has disclosed a control for an automatic clutch in which the transmissible torque, at gears or running steps having a high reduction ratio between engine rotational speed and rotational speed of the traction wheels and/or at low vehicle speed, exceeds the respective engine torque by a smaller amount than at gears or running steps with less reduction ratio and/or at higher vehicle velocity. The kinetic clutch torque follow up serves to improve the comfort and to minimize the shifting time.

In addition, U.S. Pat. No. 6,024,673 describes a brake-dependent clutch opening in which control instrument opens the clutch with a specific deceleration during a braking operation.

The problem on which this invention is based is to outline a method for clutch actuation at low temperatures which ensures a satisfactory operation of the clutch.

DETAILED DESCRIPTION OF THE INVENTION

It is accordingly proposed, especially at low temperatures, to implement a situation-dependent pre-opening of the clutch when a braking is probably coming. The probability of braking exists, for example, when the driver leaves the accelerator pedal. In such a situation and according to the invention, the clutch is pre-opened so as only to transmit somewhat more than the actual engine torque. When a braking subsequently takes place, part of the clutch path has already been covered so that, despite the low adjusting velocity resulting from the viscosity, the clutch promptly becomes open whereby the engine is protected from stalling.

A clutch is advantageously pre-opened only at low temperatures at which, due to the high viscosity of the hydraulic fluid, the clutch actuator velocity is insufficient. This means that below a certain temperature limit the inventive follow-up of the clutch torque is activated; above said temperature the clutch is closed with over-adaptation.

To prevent a too frequent clutch actuation, it is possible according to the invention to omit said pre-opening of the clutch in situations where a braking is improbably or uncritical, as is the case, for example, at high rotational speeds or gears.

The invention claimed is:

1. A method of actuating a hydraulically actuatable clutch for a motor vehicle at low temperature, wherein below a predetermined temperature and when a foot of a vehicle driver is removed from an accelerator pedal, a situation-dependent pre-opening of the clutch is executed by partially reducing an engagement force of the clutch prior to braking.

2. The method according to claim 1, wherein the clutch is pre-opened so that slightly more than an actual torque of an engine is transmitted by the clutch.

3. The method according to claim 1, wherein at high rotational speeds of an engine of the vehicle or gears of a transmission a pre-opening of the clutch is omitted.

4. A method for clutch actuation at low temperatures for a motor vehicle having a hydraulically actuatable clutch, the method comprising the steps of:
   measuring a hydraulic fluid temperature of the clutch and comparing the hydraulic fluid temperature with a pre-determined temperature limit;
   anticipating a braking operation of the vehicle;
   determining an actual engine torque;
   pre-opening the clutch by reducing a clutch engagement force when the hydraulic fluid temperature is below the pre-determined temperature prior to a braking operation; and
   reducing the clutch engagement force to a value slightly greater than a value necessary for transmitting the actual engine torque.

5. The method according to claim 4, further comprising the step of anticipating the braking operation of the vehicle according to a release of the accelerator pedal.

6. The method according to claim 4, further comprising the step of omitting the pre-opening of the clutch at high rotational speeds or gears.

7. A method of actuating a hydraulically actuatable clutch of a motor vehicle at low temperature, the method comprising the steps of:
   executing a situation-dependent pre-disengagement of the clutch, only when an operating temperature of hydraulic fluid of the clutch is below a predetermined temperature, when a foot of a vehicle driver is removed from an accelerator pedal of the vehicle by partially reducing an engagement force of the clutch, in anticipation of the vehicle driver applying a brake of the vehicle, so as to protect stalling of an engine of the vehicle upon braking of the vehicle.

* * * * *